Figure 2:
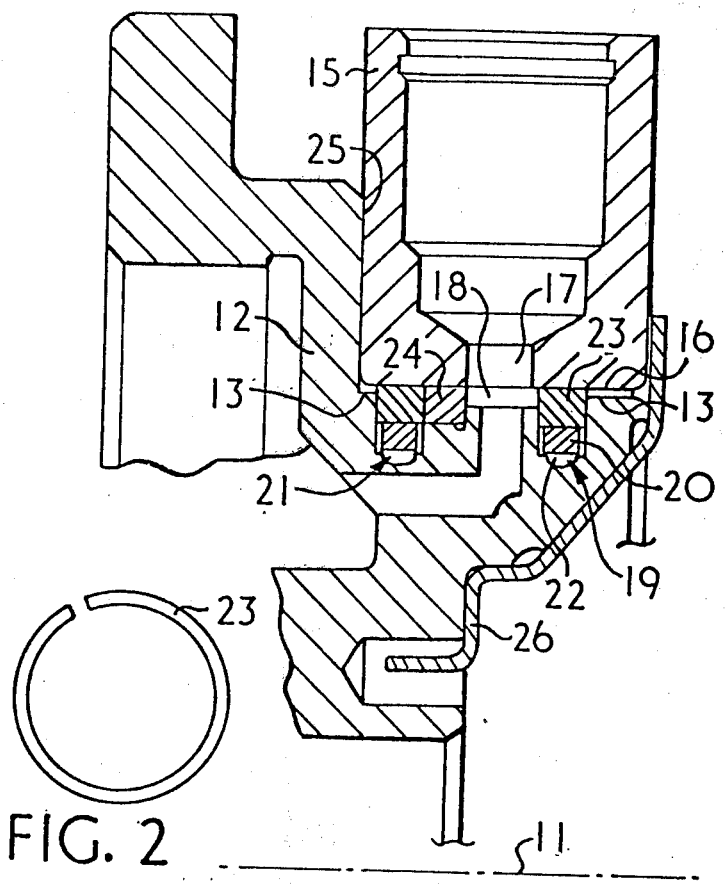

United States Patent [19]

Killian et al.

[11] 4,268,044
[45] May 19, 1981

[54] FLUID CONNECTIONS TO ROTARY MEMBERS

[75] Inventors: Daniel L. Killian; Peter E. Fraser, both of Leamington Spa, England

[73] Assignee: Automotive Products Limited, Leamington Spa, England

[21] Appl. No.: 36,810

[22] Filed: May 7, 1979

Related U.S. Application Data

[63] Continuation of Ser. No. 853,524, Nov. 21, 1977, abandoned.

[30] Foreign Application Priority Data

Nov. 25, 1976 [GB] United Kingdom ............... 49215/76

[51] Int. Cl.³ ................................................ F16J 15/00
[52] U.S. Cl. .......................................... 277/59; 277/71; 277/DIG. 8; 308/36.1
[58] Field of Search ............... 277/59, 71, 75, DIG. 8; 308/36.1

[56] References Cited

U.S. PATENT DOCUMENTS 3,149,849  9/1964  Baldridge ............................ 277/165
3,565,447  2/1971  Jochin et al. ........................ 277/59
3,592,480  2/1971  Koranyl .............................. 277/147

FOREIGN PATENT DOCUMENTS 726457  1/1966  Canada ........................ 277/DIG. 8

Primary Examiner—Robert I. Smith
Attorney, Agent, or Firm—Kemon & Estabrook

[57] ABSTRACT

A connection for the supply of fluid under pressure to a rotary member. The connection comprising a rotary member having a rotary surface; a non-rotatory annular member having a stationary surface engaged with said rotary surface at an interface therebetween; a finite clearance between said surfaces at the interface; one fluid passageway in the non-rotatory member connecting with the interface; a second fluid passageway in the rotary member connecting with the interface; and a groove providing a continuous connection between the two passageways. There are two seals, located either side of the groove at the interface which act between the two members and a bearing ring also arranged at the interface to hold the non-rotatory member concentric with rotary member, the non-rotatory member being free to move radially except for the contraint provided by the bearing ring.

3 Claims, 2 Drawing Figures

U.S. Patent  May 19, 1981  4,268,044

FLUID CONNECTIONS TO ROTARY MEMBERS

This is a continuation of application Ser. No. 853,524, filed Nov. 21, 1977 and now abandoned.

The invention relates to fluid connections to rotary members and more particularly to a connection for the supply of fluid under pressure to a rotary member.

One situation in which such a connection is frequently required is in the supply of hydraulic fluid under pressure from a stationary control valve assembly of an automatic vehicle transmission to a rotating hydraulically controlled friction clutch in the transmission.

According to the present invention there is provided a connection for the supply of fluid under pressure to a rotary member and comprising; a rotary member having a rotatable surface; a non-rotatory annular member having a stationary surface adjacent said rotary surface and within which the rotary member rotates, there being a finite clearance between the stationary and rotary surfaces forming an annular chamber therebetween; a first fluid passageway in the rotary member connecting with the chamber; a second fluid passageway in the non-rotatary member connecting with the chamber; an annular groove in one of said stationary surface and rotary surface providing in continuous connection between the first and second passageways at all rotary positions of the rotary member; two seals acting between the rotary and non-rotatary members and located one either side of the annular groove and defining the ends of the chamber; and a bearing ring of wear resistant material also arranged between the rotary and non-rotatary members so as to hold the rotary member and non-rotatary members concentric, the non-rotatary member being free to move radially except for the constraint of the bearing ring.

Preferably each seal includes a sealing ring which is resiliently biased, preferably by an expander ring located radially between the ring and the rotary member, against the non-rotatary member.

Conveniently the sealing rings and bearing ring are all formed from the same plastics material, and preferably the material is bronze filled Polytetrafluoroethylene )P.T.F.E.) or alternatively it may be a polyimide/polyamide copolymer, Torlon (Registered Trade Mark) 4301.

Figure 1:
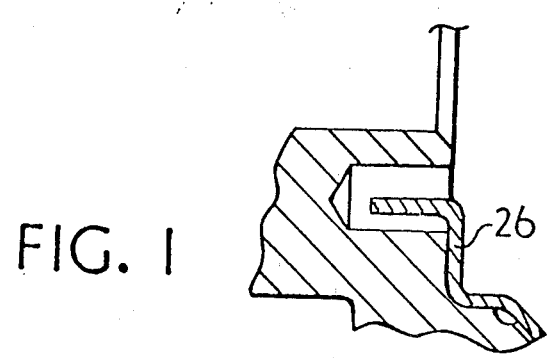

An embodiment of the invention will now be described with reference to the accompanying drawing in which FIG. 1 is a cross-section through part of a fluid connection in accordance with the invention.

FIG. 2 is a sealing ring as shown in FIG. 1.

The fluid connection is generally circular about an axis of rotation 11, but in the interests of simplicity only one half of the section is shown. A rotary member 12 is part of an automatic transmission and incorporates a hydraulically operated friction clutch (not shown) to which a fluid supply under pressure is required. The rotary member 12 has an external cylindrical surface 13 from which a first fluid passage 14 leads to the clutch. The cylindrical surface 13 is surrounded by a non-rotatory annular member 15 known as a muff, which has an internal cylindrical stationary surface 16, facing the rotatory surface 13. There is a finite clearance between the stationary surface 16 and the rotatory surface 13. A second fluid passage 17 in the muff 15 leads from an external fluid supply source through the muff to the surface 16. The rotary member 12 incorporates an annular groove 18 to ensure continuous connection between passages 14 and 17 at all rotary positions of the rotary member.

There are two similar annular fluid seals 19 and 21 in the surface 13 and only one of these, namely seal 19, will be described in detail. Seal 19 is disposed in an annular groove 22 in the rotary member 12. A sealing ring 23 occupies the whole of the width of the groove and bears against stationary surface 16 of the muff. Sealing ring 23 is formed from a low friction material and is in the form of a split ring, a suitable material being Polytetrafluoroethylene (P.T.F.E.). A split expander ring 20 of spring steel is arranged in the groove 22 and bears against the sealing ring 23 to ensure good contact with surface 16. There is clearance in the groove 22 below the rings 20 and 23 to ensure that bearing loads between the muff and the rotary member cannot be transmitted through the seal.

In use the side of the sealing ring towards the centre of the hydraulic connection is pressurised by hydraulic fluid and this urges the sealing ring into sealing contact with the opposite edge of groove 22. The expander ring ensures sealing contact between the sealing ring and stationary surface 16. Thus an effective seal is provided between the surfaces 13 and 16 at one side of the hydraulic connection. A similar seal is provided by seal 21 at the other side of the hydraulic connection.

A bearing ring 24 is arranged on a reduced diameter portion of the rotary member adjacent the seal 21. The bearing ring is formed from a low friction wear resistant material, bronze filled Polytetrafluoroethylene (P.T.F.E.) is a suitable material. The bearing ring is a split ring to facilitate assembly and which as can be seen from FIG. 1 is of substantially the same dimensions as the sealing ring 23. The thickness of the bearing ring between the diameter of surface 16 of the muff and the reduced diameter part of the rotary member on which it is arranged is controlled to close tolerance in relation to these diameters so that the bearing ring locates the muff radially with respect to the rotary member.

It has been found that a bronze filled P.T.F.E. material, such as is utilised for the bearing ring 24, is also suitable for utilisation in the form of the sealing rings in the seals 19 and 21. Thus the three rings may be manufactured from the same material.

The muff 15 is held against rotation by means such as a slightly flexible fluid supply tube or a flexible strap but is otherwise constrained solely by the rotary member. Axial constraint is provided by a shoulder 25 on the rotary member and a clip 26 also secured to the rotary member.

Thus the muff is fully located without using the seals 19 and 21 for any location purpose and without relying on accurately concentric mountings of the rotary member and the muff within a housing.

In a further alternative, the sealing ring adjacent the bearing ring may be integral with the bearing ring. The associated expander ring then holds the composite bearing and sealing ring in an outward direction while the bearing ring, backed directly by the rotary member locates the muff radially.

It has been found that the use of P.T.F.E. and bronze filled P.T.F.E. sealing rings whilst providing a suitable fluid connection as herein described has a slight disadvantage in that when the connection is heated the split sealing rings expand and the two ends of each ring are thrust one against the other. Bronze filled P.T.F.E., whilst being a good sealing and low friction wear resistant material has poor load bearing qualities, and tends to creep under load particularly at elevated temperatures. Thus the sealing rings expand and the ends of the ring distort slightly under the load created by the expansion. When the fluid connection is cooled a larger than necessary gap then exists between the ends of each split ring, since the P.T.F.E. will have crept during the distortion and will not have elastically returned to its original shape.

It has been found that by utilising a material the co-efficient of linear expansion of which is approaching that of the metal parts of the rotary member and muff, this problem can be reduced. The metal parts are normally manufactured from a ferrous material and in particular cast iron which has a co-efficient of linear expansion of approximately $0.59 \times 10^{-5}$ in/in ° F. ($1.06 \times 10^{-5}$ cm/cm ° C. A suitable bearing and sealing ring material has been found to be a P.T.F.E. and graphite filled polyimide/polyamide copolymer known as Torlon (Registered Trade Mark) 4301. This material has a co-efficient of approximately $1.6 \times 10^{-5}$ in/in ° F. ($2.88 \times 10^{-5}$ cm/cm ° C.).

Another advantage of this material is that it has excellent load bearing properties e.g. compressive strength of 30,000 p.s.i. at 73° F. (21,09 kgf/cm$^2$ ASTM D.695 test), and will not readily distort if the ends of a split ring touch due to expansion. Furthermore the Torlon (Registered Trade Mark) material being more elastic than the P.T.F.E. will revert to its original shape more nearly after cooling, and is sufficiently resilient that a sealing ring manufactured therefrom can be utilised without an associated expander ring.

A fluid connection as described above may be used in a variety of other applications where a fluid supply to a rotary member is required.

We claim:

1. A rotary fluid supply connection in a power hydraulic apparatus comprising:
   two relatively rotatable co-axial members having opposed cylindrical surfaces defining an annular chamber therebetween;
   passageways opening into said surfaces for the continuous flow of hydraulic fluid from one member to the other;
   a pair of spaced apart resilient sealing rings acting between the surfaces and located one each side of the fluid passageways to define the ends of the annular chamber;
   two annular grooves in the rotary member in each of which a sealing ring is located, and there is a clearance in each groove radially inwards of the respective sealing ring to ensure that full bearing loads cannot be transmitted between the co-axial members through the sealing rings; and
   a bearing ring, wherein the bearing ring is located between the fluid passageways and one of the sealing rings and is located on a reduced diameter portion of the rotary member that interconnects with one axial side of a groove housing a sealing ring, said bearing ring restraining radial movement between the two members and being made of the same plastics bearing material as the sealing rings.

2. A rotary connection as claimed in claim 1, wherein the bearing ring is formed integrally with a sealing ring.

3. A rotary connection as claimed in claim 1 wherein the bearing ring and sealing rings are of substantially the same dimensions.

* * * * *